(12) United States Patent
Hughes

(10) Patent No.: US 9,482,346 B2
(45) Date of Patent: Nov. 1, 2016

(54) SYSTEM AND METHOD FOR CONTROLLING A COMPRESSOR INLET VALVE

(71) Applicant: Clark Equipment Company, Statesville, NC (US)

(72) Inventor: Kevin Hughes, Stony Point, NC (US)

(73) Assignee: CLARK EQUIPMENT COMPANY, Statesville, NC (US)

( * ) Notice: Subject to any disclaimer, the term of this patent is extended or adjusted under 35 U.S.C. 154(b) by 235 days.

(21) Appl. No.: 14/026,717

(22) Filed: Sep. 13, 2013

(65) Prior Publication Data

US 2015/0076381 A1    Mar. 19, 2015

(51) Int. Cl.
| | |
|---|---|
| F16K 1/22 | (2006.01) |
| F04C 29/12 | (2006.01) |
| F16K 31/122 | (2006.01) |
| F16K 31/12 | (2006.01) |
| F04C 18/16 | (2006.01) |

(52) U.S. Cl.
CPC ............ *F16K 1/221* (2013.01); *F04C 29/124* (2013.01); *F16K 31/12* (2013.01); *F16K 31/122* (2013.01); *F04C 18/16* (2013.01)

(58) Field of Classification Search
CPC ...... F16K 1/221; F16K 31/12; F16K 31/122; F04C 29/124; F04C 18/16
USPC ...... 251/26, 28, 31, 305; 137/15.25, 315.22, 137/484, 601.17
See application file for complete search history.

(56) References Cited

U.S. PATENT DOCUMENTS

| | | | |
|---|---|---|---|
| 2,189,475 A * | 2/1940 | Saur | 123/389 |
| 2,884,003 A * | 4/1959 | Jensen | 137/495 |
| 3,258,229 A * | 6/1966 | Larson | 244/134 R |
| 3,330,473 A | 7/1967 | Lee | |
| 3,882,889 A * | 5/1975 | Allen et al. | 137/454.2 |
| 4,682,674 A * | 7/1987 | Schmidt | 188/273 |
| 6,694,746 B2 * | 2/2004 | Reed et al. | 60/787 |
| 7,731,152 B2 * | 6/2010 | Abel et al. | 251/63.5 |
| 8,286,661 B2 * | 10/2012 | Krake et al. | 137/487 |
| 8,376,311 B2 * | 2/2013 | Marshall et al. | 251/58 |
| 8,671,683 B2 * | 3/2014 | Lilly | 60/612 |
| 2003/0192595 A1 * | 10/2003 | Benson | 137/488 |
| 2012/0199211 A1 * | 8/2012 | Schroder et al. | 137/14 |

FOREIGN PATENT DOCUMENTS

| | | |
|---|---|---|
| JP | 57-126595 | 8/1982 |
| JP | 05-10285 | 1/1993 |

OTHER PUBLICATIONS

EP14184235.1 Extended European Search Report dated Feb. 2, 2015 (6 pages).

\* cited by examiner

*Primary Examiner* — Marina Tietjen
*Assistant Examiner* — Daphne M Barry
(74) *Attorney, Agent, or Firm* — Michael Best & Friedrich LLP

(57) ABSTRACT

An air compressor system includes a housing defining an inlet and an outlet, a butterfly valve coupled to the inlet and movable between a closed position and an open position, and an actuator coupled to the butterfly valve and operable to apply an actuator force to the butterfly valve to move the actuator and the butterfly valve to a desired position between the closed position and the open position. A feedback actuator is coupled to the actuator and is operable to apply a variable secondary force to the butterfly valve in opposition to the actuator force, the secondary force varying in response to the position of the butterfly valve.

24 Claims, 7 Drawing Sheets

SYSTEM AND METHOD FOR CONTROLLING A COMPRESSOR INLET VALVE

BACKGROUND

The invention relates to system and method for controlling an inlet valve for a compressor. More specifically, the invention relates to a system and method for controlling an inlet butterfly valve for an air compressor.

Compressors, and in particular air compressors often employ an inlet valve to control the quantity of air flowing into the compressor. Some valves are unstable at low flow rates or low opening points thus making them unsuitable for use in an air compressor application.

SUMMARY

In one construction, the invention provides an air compressor system that includes a housing defining an inlet and an outlet, a butterfly valve coupled to the inlet and movable between a closed position and an open position, and an actuator coupled to the butterfly valve and operable to apply an actuator force to the butterfly valve to move the actuator and the butterfly valve to a desired position between the closed position and the open position. A feedback actuator is coupled to the actuator and is operable to apply a variable secondary force to the butterfly valve in opposition to the actuator force, the secondary force varying in response to the position of the butterfly valve.

In another construction, the invention provides an air compressor system that includes a housing defining an inlet and an outlet and a butterfly valve including a housing coupled to the inlet and a disk movable between a closed position and an open position, the disk defining an upstream side and a downstream side of the butterfly valve. An actuator includes a cylinder and a spool disposed within the cylinder. The spool defines a first portion, a second portion, and a third portion. A control fluid inlet is formed in the cylinder and is positioned to direct control fluid to the second portion. A feedback actuator includes a first port formed in the cylinder adjacent the third portion and a second port on the downstream side of the butterfly valve, and a conduit interconnecting the first port and the second port to provide fluid communication between the third portion and the downstream side of the butterfly valve.

In yet another construction, the invention provides a method of controlling flow into a compressor. The method includes positioning a butterfly valve at an inlet to the compressor, the butterfly valve including a disk movable between an open position and a closed position and defining an upstream side and a downstream side. The method also includes coupling an actuator to the disk, the actuator including a cylinder and a spool disposed in the cylinder to define a first portion, a second portion, and a third portion and directing a flow of control fluid to the second portion to move the butterfly valve toward the closed position. The method further includes connecting the downstream side of the valve to the third portion of the cylinder to provide a feedback force to the spool, the force varying between a maximum when the disk is in the closed position and a minimum when the disk is in the open position.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
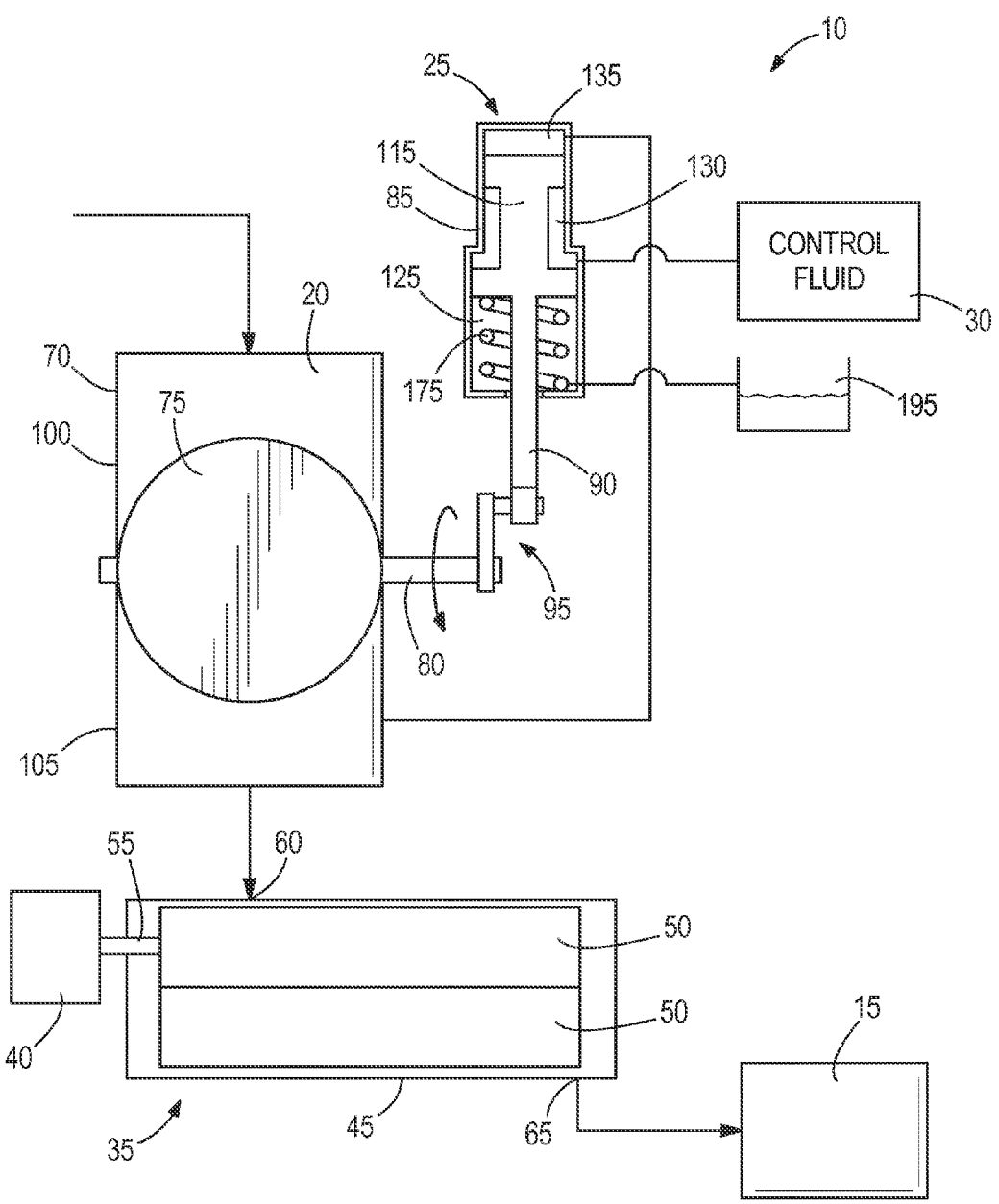
FIG. 1 is a schematic illustration of a compressor system embodying the invention.

FIG. 1 schematically illustrates a compressor system 10 that can be used to provide a compressed gas, such as air to a tank or other point of use 15. The compressor system 10 includes an inlet valve 20, an actuator 25, a source of control fluid 30, a compressor 35, a drive member 40 and the point of use 15 or storage tank. The compressor 35 can be virtually any type of compressor. However, the invention is illustrated herein as applied to a rotary screw compressor 35. As is schematically illustrated in FIG. 1, the compressor 35 includes a housing 45 that surrounds and encloses two or more rotating screws 50. One of the screws 50 is a drive screw that includes a shaft 55 that extends out of the housing 45. The shaft 55 is coupleable to the drive member 40 (e.g., a motor or engine) to provide rotational energy to drive the compressor 35. The housing 45 also defines an air inlet 60 and a compressed air outlet 65.

Figure 2:
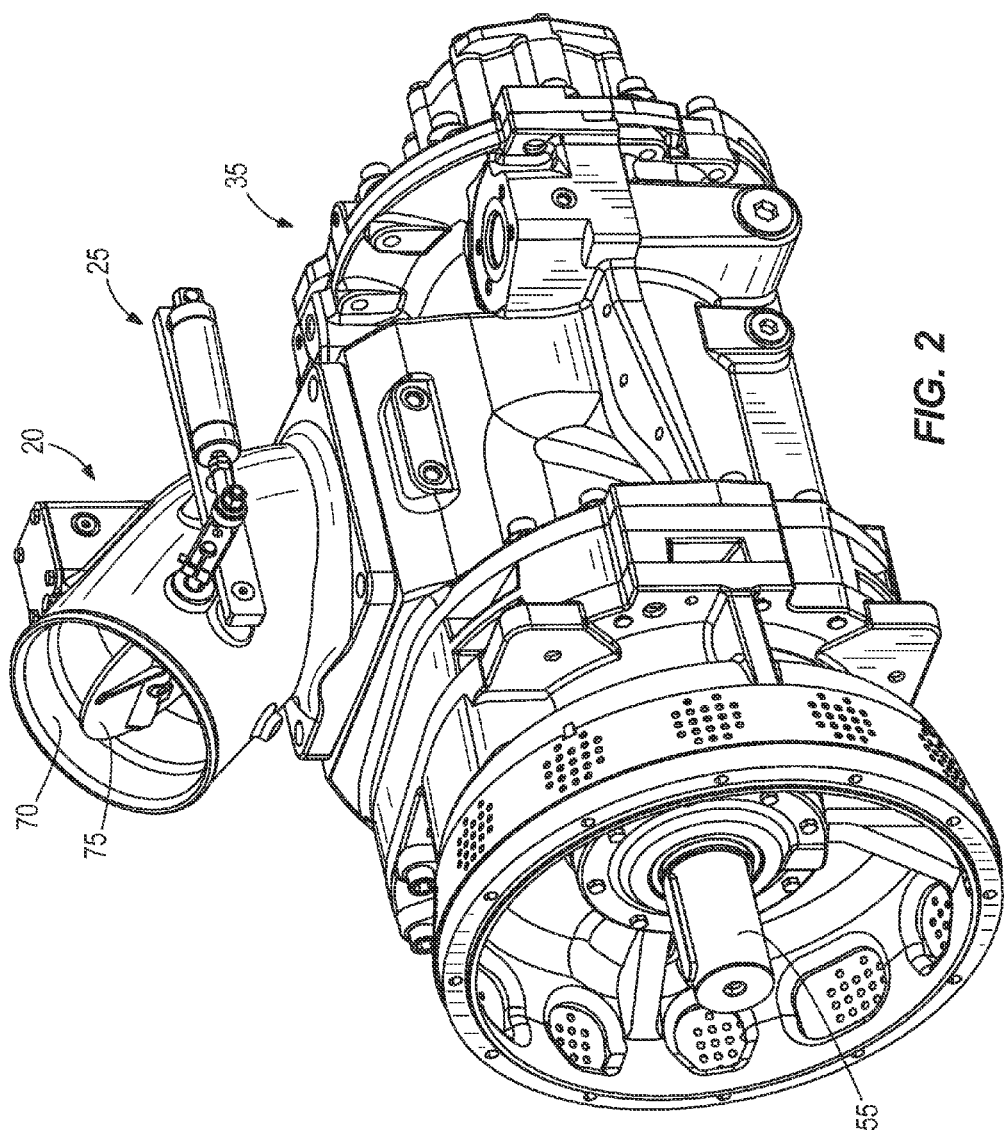
FIG. 2 is a perspective view of an air compressor and inlet valve assembly.

Turning to FIG. 2, a compressor assembly including the compressor 35, the inlet valve 20, and the actuator 25 are illustrated in greater detail. The inlet valve 20 and the actuator 25 are attached to the compressor housing 45 at the air inlet 60. As illustrated in FIG. 2, the inlet valve 20 includes a butterfly valve having a housing 70 and a disk 75 disposed within the housing 70. The disk 75 includes a shaft 80 that extends from the housing 70 and is rotatable to move the disk 75 and the butterfly valve 20 between a closed position and an open position.

Figure 3:
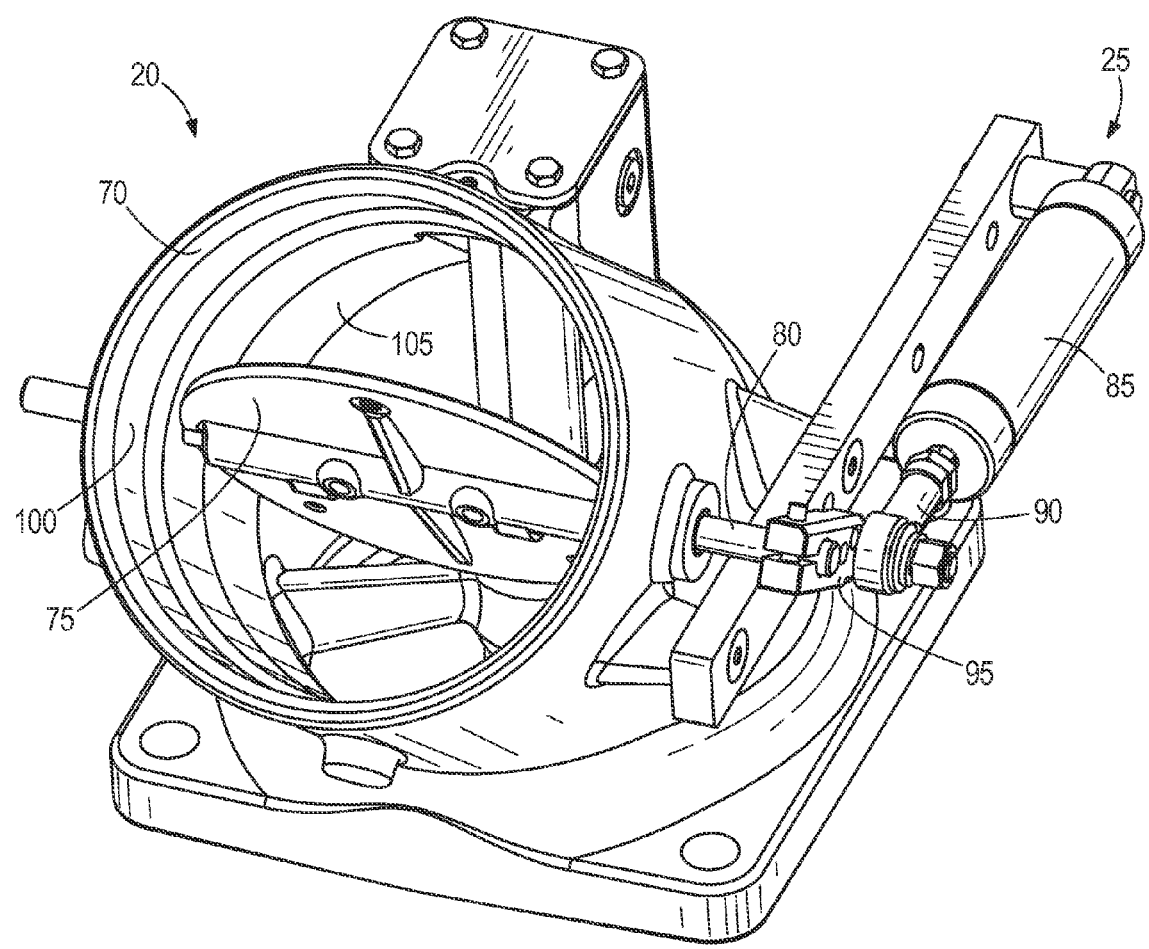
FIG. 3 is a perspective view of the inlet valve assembly of FIG. 2.

With continued reference to FIG. 2, the actuator 25 is illustrated as including an elongated cylindrical actuator such as a pneumatic actuator or a hydraulic actuator. The actuator 25 includes a cylinder 85 and an arm 90 extending from the cylinder 85. As is best illustrated in FIG. 3, the cylinder 85 is coupled to the butterfly valve 20 at a single pivot point 90 to inhibit translation of the cylinder 85 with respect to the butterfly valve 20. The arm 90 is connected to the shaft 80 of the disk 75 via a linkage 95 such that movement of the arm 90 produces the desired rotation of the disk 75. In this way, the actuator 25 moves between an open position and a closed position to move the disk 75 between the open and the closed positions.

As one of ordinary skill will understand, the butterfly valve 20, and more specifically the disk 75 defines an upstream side 100 of the valve 20 and a downstream side 105 of the valve 20. When the disk 75 is in the closed position, little or no flow passes from the upstream side 100 to the downstream side 105.

Figure 4:
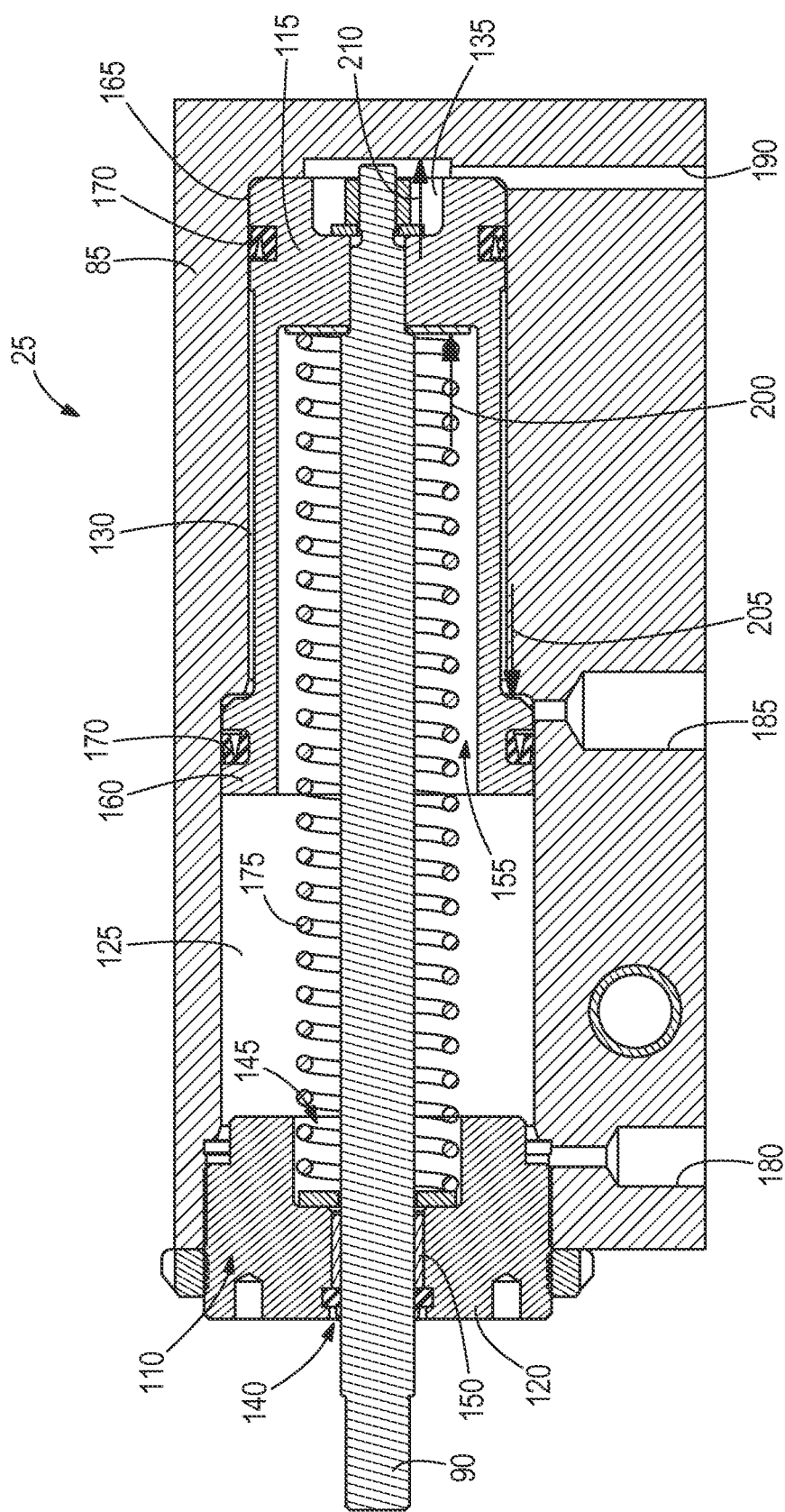
FIG. 4 is a cross section of an actuator of the valve assembly of FIG. 3.

FIG. 4 illustrates a section view through the centerline of the actuator 25 of FIG. 3. As can be seen, the cylinder 85 has an open end 110, a spool 115 positioned within the cylinder 85, and an end cap 120. The spool 115 divides the space within the cylinder 85 into a first portion 125, a second portion 130, and a third portion 135. The end cap 120 is coupled to the open end 110 of the cylinder 85 to enclose the first portion 125 and includes a passage 140 for the arm 90 to pass. In addition, the end cap 120 defines a cylindrical pocket 145 sized to allow the arm 90 to pass with a large clearance. A seal 150 is positioned within the passage to form a seal between the arm 90 and the end cap 120, while still allowing relatively free movement of the arm 90.

The spool 115 includes an interior space 155 such that the spool 115 is shaped much like an elongated cup. The spool 115 includes a first land 160 that is sized to sealingly engage an inner wall of the cylinder 85 to define the boundary between the first portion 125 and the second portion 130. A second land 165 is formed on the opposite end of the spool 115 and is sized to sealingly engage the inner wall of the cylinder 85 to define a boundary between the second portion 130 and the third portion 135. Thus, the first portion 125 is defined as the space between the end cap 120 and the first land 160, the second portion 130 is defined as the space between the first land 160 and the second land 165, and the third portion 135 is defined as the space between the second land 165 and the end of the cylinder 85 opposite the end cap 120.

In the construction illustrated in FIG. 4, seal members 170 are positioned in grooves formed in the first land 160 and the second land 165 to enhance the seal. Some constructions may use additional seal members 170, other seal member designs, or no seal members whatsoever.

With continued reference to FIG. 4, a biasing member 175 in the form of a coil spring is disposed in the first portion 125 of the actuator 25. The biasing member 175 includes a first end positioned within the pocket 145 of the end cap 120 and a second end positioned within the interior space 155 of the spool 115. The biasing member 175 illustrated in FIG. 4 is arranged to bias the spool 115 away from the end cap 120. When the spool 115 is positioned away from the end cap 120, as illustrated in FIG. 3, the disk 75 is in the open position. While FIG. 4 illustrates a biasing member 175 that provides a linearly varying biasing force, other constructions could employ a non-linear spring if desired.

The cylinder 85 includes a first aperture 180 that provides fluid communication with the first portion 125 and a second aperture 185 that provides fluid communication with the second portion 130. A third aperture 190 provides fluid communication with the third portion 135.

To assemble the system for use, the actuator 25 is coupled to the butterfly valve 20 as illustrated and described with regard to FIG. 3, the valve 20 is then attached to the compressor 35 adjacent the inlet 60 to the compressor 35. The first aperture 180 of the cylinder 85 is connected to a vent 195 or a drain to allow flow into and out of the first portion 125. In this way, the pressure within the first portion 125 is maintained at about atmospheric pressure.

The second aperture 185 of the cylinder 85 is connected to the source of control fluid 30. The control fluid pressure is varied to apply a force on the spool 115. In the illustrated construction, the pressure varies between 0 psig and about 50 psig with different pressure values and ranges of pressure also being possible.

The third aperture 190 of the cylinder 85 is connected to the valve 20 at a point downstream of the disk 75 such that the pressure within the third portion 135 is substantially equal to the pressure downstream of the valve 20. Typically, this pressure ranges from a low vacuum pressure (e.g., 5 psia or −9.7 psig) when the disk 75 is in the closed position to a high pressure of about atmospheric pressure when the disk 75 is in the open position.

In operation, the inlet valve 20 is used to reduce the mass flow through the compressor 35 when the mass flow is not needed. This allows the compressor 35 to operate at an efficient speed without producing excessive air and without having to cycle excessively. In a typical application, a control system will vary the position of the butterfly valve 20 to achieve a desired flow rate.

To position the butterfly valve 20 at a desired position requires the adjustment of the control fluid pressure to achieve a balance between a biasing force 200, an actuator force 205, and a feedback force 210 (sometimes referred to as a secondary force). The biasing force 200 is produced by the biasing member 175 and varies linearly between a maximum value when the valve is closed and a minimum value when the valve is opened. The actuator force 205 acts in opposition to the biasing force 200 and is a function of the regulation pressure of the control fluid 30. Thus, as a pressure is applied in the second portion 130, the spool 115 will tend to move to close the disk 75. However, as the spool 115 moves, the biasing member 175 will be compressed, thereby increasing the biasing force 200 until a balance is achieved. Once a balance is achieved the spool 115 will stop moving.

Figure 5:
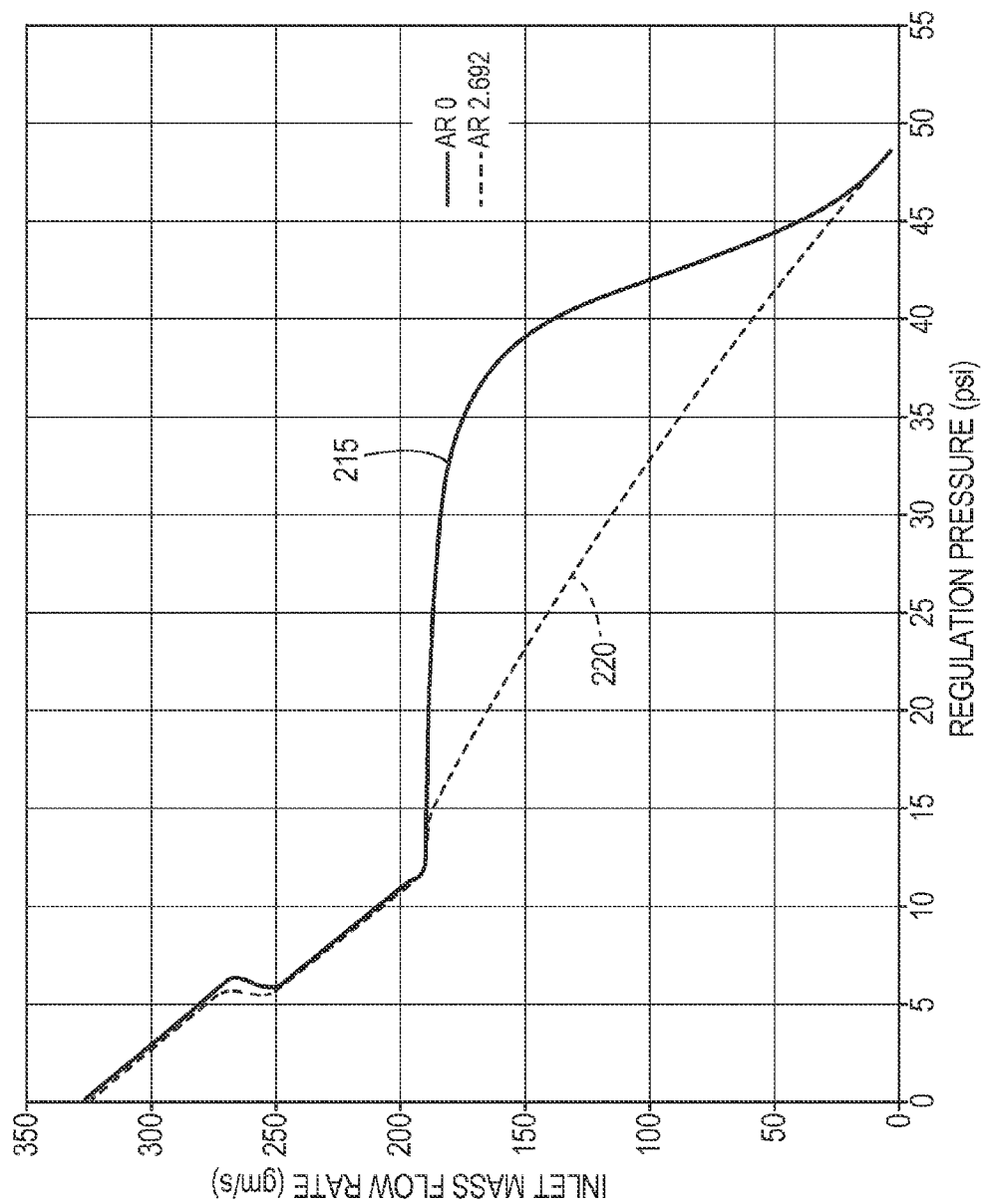
FIG. 5 is a graphical illustration of mass flow rate versus actuator regulation pressure.

As was discussed, the operation of the air compressor 35 can be very unstable when using a butterfly valve 20. FIG. 5 illustrates why this instability exists. Specifically, in an undamped (no feedback) condition (curve 215), a small change in regulation pressure (between about 38 psig and 45 psig) results in a very large change in inlet mass flow. When operating in this region, excessive hunting and even unstable operation can occur.

The invention corrects this by adding the feedback force 210. The feedback is achieved by adding the feedback force which varies in a non-linear fashion as will be described. As discussed with regard to FIG. 4, the third portion 135 of the actuator 25 is in fluid communication with the downstream side 105 of the butterfly valve 20. When the valve 20 is closed, very little mass flow passes through the valve 20 to the compressor 35. However, continued compressor operation produces a partial vacuum in the region downstream of the closed disk 75. This vacuum pressure is communicated to the third portion 135 of the actuator 25, thereby producing a large feedback force 210 on the spool 115 in the same direction as the biasing force 200. As the disk 75 opens, mass flow passes to the downstream side 105 of the butterfly valve 20 and the vacuum is reduced until the valve 20 is fully open and the pressure downstream of the disk 75 is about equal to atmospheric pressure. This added force results in curve 220 illustrated in FIG. 5. As is illustrated, the relationship between the regulation pressure and the mass flow through the valve 20 is much closer to linear and the valve 20 is easily controlled and remains stable.

Figure 6:
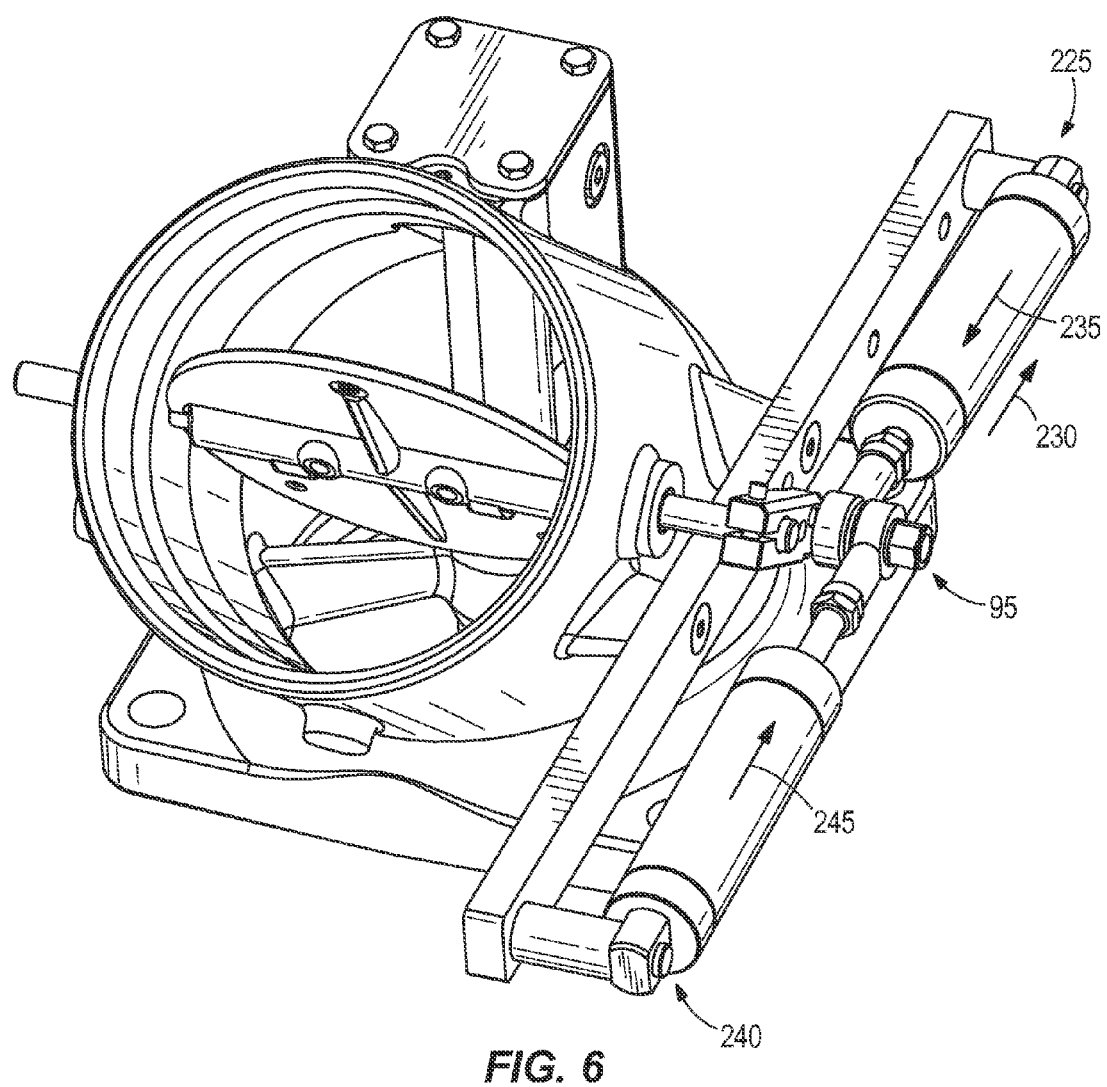
FIG. 6 is a perspective view of another air compressor and inlet valve assembly.

While the constructions illustrated herein include an actuator 25 having a feedback actuator formed as part of the actuator 25, other constructions could separate these components. For example, FIG. 6 illustrates an arrangement in which a standard actuator 225 operates the butterfly valve 20. The standard actuator 225 includes a biasing member that produces a biasing force 230 in the direction indicated and as was described with regard to FIG. 4. A control fluid is directed to the standard actuator 225 at varying pressures to produce an actuator force 235 in the direction indicated. However, there is no feedback force in the standard actuator 225. Rather, a second actuator 240 is coupled to the standard actuator 225 or the linkage 95 and is arranged to deliver a feedback force 245 in the direction indicated and in response to a pressure signal. A connection between the downstream side 105 of the valve 20 and the second actuator 240 provides the pressure signal for the second actuator 240. Thus, a high vacuum pressure (when the valve 20 is closed) produces the largest feedback force 245 in the direction indicated, while little or no vacuum (when the valve 20 is open) results in a smaller feedback force 245.

Figure 7:
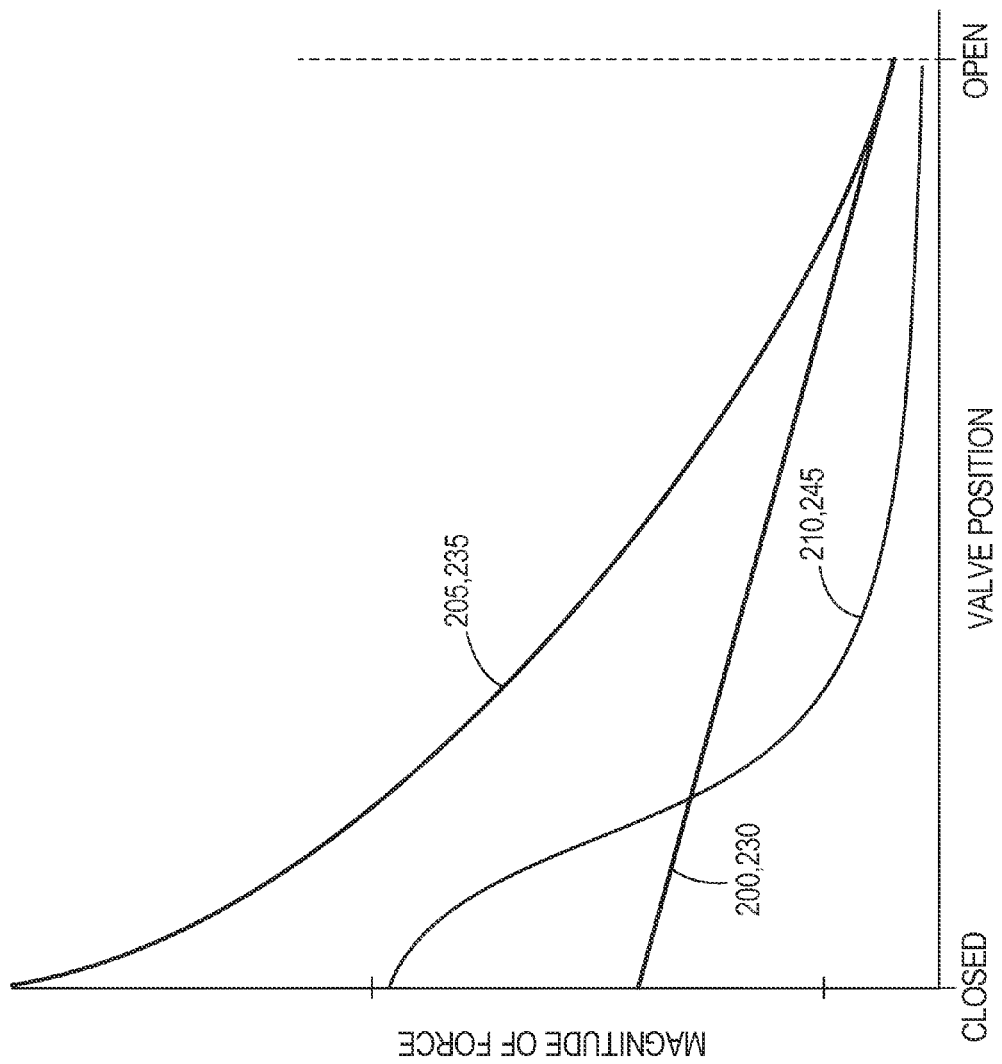
FIG. 7 is a graphical illustration of force versus valve position for three different forces applied to the valve.

In yet another construction, a non-linear spring is employed in place of the linear spring and the feedback actuator or the second actuator 240. The non-linear spring is arranged to provide the force profile discussed above and illustrated in FIG. 7.

Various features and advantages of the invention are set forth in the following claims.

I claim:

1. An air compressor system comprising:
a housing defining an inlet and an outlet;
a butterfly valve coupled to the inlet of the housing and movable between a closed position and an open position to regulate the flow of air into the housing, wherein air on an upstream side of the butterfly valve is at atmospheric pressure and air on a downstream side of the butterfly valve is equal to or less then atmospheric pressure;
an actuator coupled to the butterfly valve and operable to apply an actuator force to the butterfly valve to move the actuator and the butterfly valve to a desired position between the closed position and the open position;
a feedback actuator coupled to the actuator and operable to apply a variable secondary force to the butterfly valve in opposition to the actuator force, the secondary force varying in response to the position of the butterfly valve; and
a biasing member coupled to the actuator and operable to bias the actuator and the butterfly valve toward the open position.

2. The air compressor of claim 1, wherein the actuator includes a cylinder and a spool disposed within the cylinder, the spool dividing the cylinder into a first portion, a second portion, and a third portion.

3. The air compressor of claim 1, further comprising a vent in fluid communication with the first portion and a control pressure source in fluid communication with the second portion.

4. The air compressor of claim 3, wherein the butterfly valve includes a valve housing and a disk and wherein the disk defines an upstream side and a downstream side within the valve housing.

5. The air compressor of claim 4, wherein the third portion at least partially defines the feedback actuator, and wherein the third portion is in fluid communication with the downstream side of the valve housing.

6. The air compressor of claim 1, wherein the actuator force includes a control force acting in a first direction and produced by a control fluid, a biasing force acting in a second direction opposite the first direction, and a feedback force acting in the second direction.

7. The air compressor of claim 6, wherein the feedback force varies non-linearly from a maximum when the actuator and the butterfly valve are in the closed position to a minimum when the actuator and the butterfly valve are in the open position.

8. The air compressor of claim 1, wherein the actuator includes a first piston-cylinder arrangement and the feedback actuator includes a second piston-cylinder arrangement positioned to act in opposition to one another.

9. The air compressor of claim 1, wherein the biasing member includes a non-linear spring arranged to bias the actuator by providing a biasing force in a non-linearly variable fashion between a maximum when the butterfly valve is in the closed position and a minimum when the butterfly valve is in the open position.

10. An air compressor system comprising:
a housing defining an inlet and an outlet for a flow of air therebetween;
a valve body coupled to the inlet of the housing with a cavity extending through the valve body and a valve element disposed within the valve body between an upstream side and a downstream side of the cavity, the valve element movable to regulate the flow of air into the inlet of the housing, the upstream side being at atmospheric pressure and the downstream side having a pressure equal to or less than atmospheric pressure;
an actuator including a cylinder and a spool disposed within the cylinder, the spool defining a first portion, a second portion, and a third portion;
a source of control fluid that is fluidly separated from the flow of air;
a control fluid inlet formed in the cylinder and positioned to direct control fluid to the second portion from the source of control fluid; and
a feedback actuator including a first port formed in the cylinder adjacent the third portion, a second port on the downstream side of the valve element, and a conduit interconnecting the first port and the second port to provide fluid communication between the third portion and the downstream side of the valve element.

11. The air compressor of claim 10, further comprising a biasing member coupled to the actuator and operable to bias the actuator and the valve element toward an open position.

12. The air compressor of claim 11, wherein the biasing member includes a spring disposed substantially within the first portion.

13. The air compressor of claim 11, further comprising a vent in fluid communication with the first portion.

14. The air compressor of claim 10, wherein the actuator generates an actuator force to move the valve element, and wherein the actuator force includes a control force acting in a first direction and produced by the control fluid, a biasing force acting in a second direction opposite the first direction, and a feedback actuator force acting in the second direction.

15. The air compressor of claim 14, wherein the feedback actuator force varies non-linearly from a maximum when the actuator and the valve element are in a closed position to a minimum when the actuator and the valve element are in an open position.

16. The air compressor system of claim 10, wherein the housing is an air compressor housing.

17. A method of controlling flow into a compressor, the method comprising:
positioning a valve assembly at an inlet to the compressor, the valve assembly including a disk movable between an open position and a closed position and defining an upstream side and a downstream side of a flow of air within the valve assembly, the upstream side being at atmospheric pressure and the downstream side having a pressure equal to or less than atmospheric pressure;
coupling an actuator to the disk, the actuator including a cylinder and a spool disposed in the cylinder to define a first portion, a second portion, and a third portion;
directing a flow of control fluid from a source of control fluid that is fluidly separated from the flow of air to the second portion to move the butterfly valve toward the closed position; and
placing the downstream side of the valve in fluid communication with the third portion of the cylinder to provide a feedback force to the spool, the force varying between a maximum when the disk is in the closed position and a minimum when the disk is in the open position.

18. The method of claim 17, further comprising coupling a biasing member to the actuator, the biasing member operable to produce a biasing force that biases the disk toward the open position.

19. The method of claim 18, further comprising applying a total force to the valve assembly to move the disk, the total force including the biasing force acting in a first direction, the feedback force acting in the first direction, a control force generated in response to control fluid flowing into the second portion, the control force acting in a second direction opposite the first direction.

20. The method of claim 17, wherein the feedback force is a non-linear force that varies as a function of disk position, and wherein the feedback force is at a maximum when the disk is in the closed position and is at a minimum when the disk is in the open position.

21. An air compressor system, comprising:
a compressor housing having a compressor element disposed within, an inlet for receiving air flow, and an outlet for discharging pressurized air; and
a valve assembly operably coupled to the inlet for regulating air flow into the compressor housing, the valve assembly including:
a valve housing having a cavity extending therethrough;
a valve element disposed within the cavity, the valve element being movable between an open position and a closed position and dividing the cavity into a downstream side in communication with the inlet of the compressor housing and an upstream side in selective communication with the inlet of the compressor housing;
an actuator operably coupled to the valve element and capable of moving the valve element between the open position and the closed position in response to a control force applied to the actuator;
a biasing member in communication with the actuator and configured to apply a biasing force to the actuator in opposition to the control force; and
a feedback member operable to apply a secondary force to the actuator in opposition to the control force.

22. The air compressor system of claim 21, wherein the actuator includes a cylinder and a spool disposed within the cylinder, the spool dividing the cylinder into a first portion, a second portion, and a third portion.

23. The air compressor system of claim 22, further comprising:
a source of control pressure in communication with the spool to cause the spool to move toward the closed position.

24. The air compressor system of claim 21, wherein the secondary force is at least partially provided by a path that places the actuator in fluid communication with the downstream side of the valve assembly.

* * * * *